United States Patent [19]

Hirsch

[11] Patent Number: 4,777,725
[45] Date of Patent: Oct. 18, 1988

[54] BLADE HOLDER CAPABLE OF HOLDING TWO DIFFERENT DEBURRING BLADES AND A DEBURRING TOOL UTILIZING SAME

[75] Inventor: Gustav Hirsch, Nahariyya, Israel
[73] Assignee: Noga Engineering Ltd., Israel
[21] Appl. No.: 870,516
[22] Filed: Jun. 4, 1986
[30] Foreign Application Priority Data Jun. 5, 1985 [IL] Israel ..................................... 75417

[51] Int. Cl.$^4$ .............................................. B26B 1/00
[52] U.S. Cl. ...................................... 30/331; 30/317; 30/337
[58] Field of Search ................. 30/169, 317, 331, 337, 30/338, 172; 279/1 W, 24, 28, 26

[56] References Cited

U.S. PATENT DOCUMENTS 2,865,100  12/1958  Gilbert ................................... 30/317
2,977,668  4/1961  Maness ................................ 30/331 X

FOREIGN PATENT DOCUMENTS

| 1102507 | 5/1979 | Canada . |
| 2639988 | 3/1978 | Denmark . |
| 3023391 | 1/1982 | Denmark . |
| 2730180 | 1/1979 | Fed. Rep. of Germany ........ 30/169 |
| 57-163006 | 10/1982 | Japan . |
| 636803 | 2/1948 | United Kingdom . |
| 2067440 | 12/1979 | United Kingdom . |

Primary Examiner—Douglas D. Watts
Attorney, Agent, or Firm—Brumbaugh, Graves, Donohue & Raymond

[57] ABSTRACT

There are disclosed a blade-holder capable of holding two different deburring blades and a deburring tool utilizing the blade-holder. The blade-holder comprises of a rod, two longitudinal bores, one at each end of the rod and releasable locking means situated in the regions of the longitudinal bores.

1 Claim, 3 Drawing Sheets

BLADE HOLDER CAPABLE OF HOLDING TWO DIFFERENT DEBURRING BLADES AND A DEBURRING TOOL UTILIZING SAME

The invention relates to a blade-holder for a deburring tool. More particularly, the invention concerns a blade-holder capable of holding two different deburring blades. The invention also concerns a deburring tool comprising a handle, a deburring blade and the blade-holder according to the present invention.

Deburring tools utilizing rotating deburring blades have already been known for many years. Most common known deburring tools have a deburring blade mounted directly into the handle with the deburring blade extending in the axial direction of the handle. Such deburring tools are limited in that key only have a specific working length which does not allow the blade to be brought to different desired working positions. In order to overcome this limitation it has already been suggested such as in Israel Pat. No. 34821 and in U.S. Pat. No. 3,787,972, to use a blade-holder which allows the blade to be extended from the handle. However, since the blades are made in different sizes, it has been necessary to provide a different blade-holder for each size of blade. This is not only expensive, but also cumbersome to the operator using the deburring tool.

The present invention provides for a blade-holder which holds two different sizes of blades thereby decreasing the costs substantially and allowing more convenience to the operator using the deburring tool without effecting the efficiency of operation.

In the known deburring tools employing a blade-holder as described in the patent specifications mentioned above, the mechanism for locking the blade to the blade-holder is such that due to a protruding locking sleeve the blade-holder can be inserted into the handle through one end only. Contrary to the known devices, the locking mechanism in the blade-holder of the present invention which holds the blade securely in the blade-holder is such that both sides of the blade-holder have the same diameter as the body of the blade-holder itself and therefore it can be inserted into the handle from both sides. Thus, in accordance with the present invention, there is provided a blade-holder for a deburring tool comprising a rod, two longitudinal bores one at each end of the rod and releasable locking means situated in the regions of the longitudinal bores adapted for rotatably holding different deburring blades.

Preferably the longitudinal bores of the blade-holder according to the invention are of different diameters and lengths for holding different sized deburring blades.

The invention also provides for a deburring tool comprising in combination the blade-holder of the invention, a deburring blade and a handle, having means for fixing the rod of the blade-holder to said handle in any desired working position along the rod.

The invention is illustrated, by way of example, with reference to the accompanying drawings in which.

Figure 1:
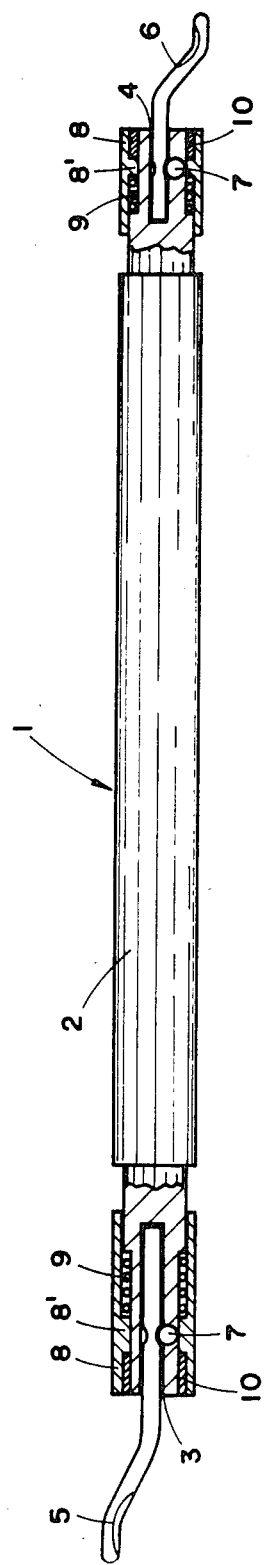
FIG. 1 is a fragmentary longitudinal section of a blade-holder according to the invention with two different sized deburring blades inserted therein.

The blade-holder 1 illustrated in FIG. 1 comprises a round rod 2 having two longitudinal bores 3 and 4 eccentric of the central longitudinal axis of the holder. The locking device at each end of the rod comprises a locking member in the form of a ball 7, which can protrude into the longitudinal bore and a sleeve 8, the outer diameter of which is identical to the outer diameter of rod 2. The non-concentric positioning of the bores permits the secure holding of blades 5 and 6 by allowing a big enough ball to be inserted between the sleeve and the rod.

Buldge 8' of sleeve 8 rests on spring 9 which, when unpressed, keeps locking sleeve 8 in the locking position and when pressed down, releases ball 7 and allows for the insertion or removal of blades 5 or 6. Locking ring 10 is provided to prevent spring 9 from pushing sleeve 8 away from blade-holder 1. In FIG. 1, longitudinal bores 3 and 4 are of different diameters and lengths thus allowing for the insertion of blades 5 and 6 which are of different sizes.

Figure 2:
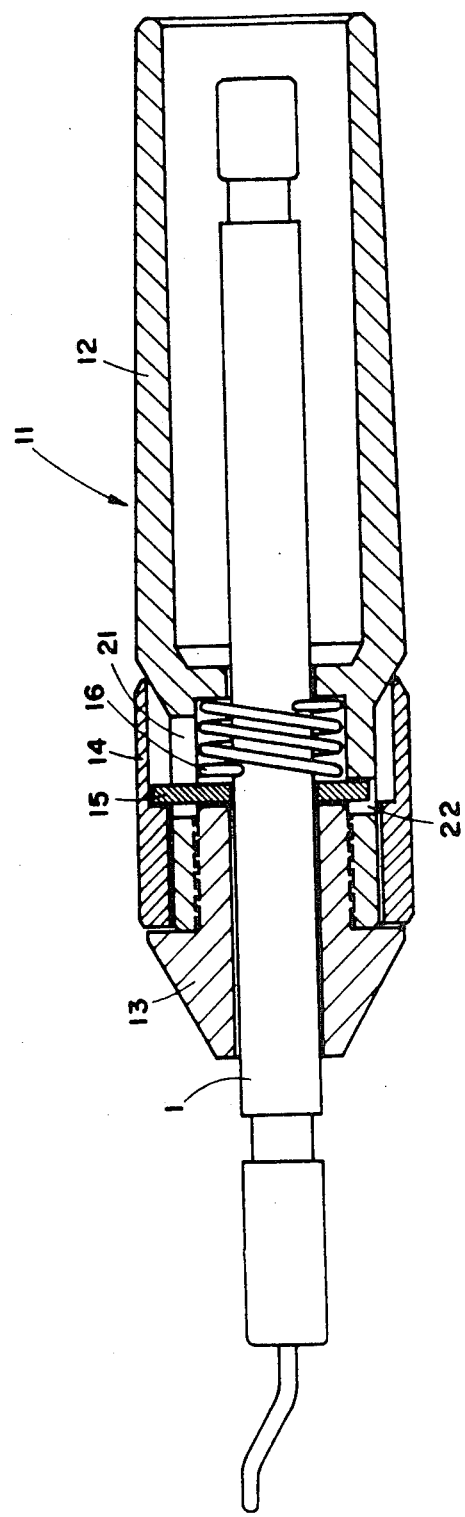
FIG. 2 is a fragmentary longitudinal section of a deburring tool according to the invention with a blade-holder in an unlocked position.
Figure 3:
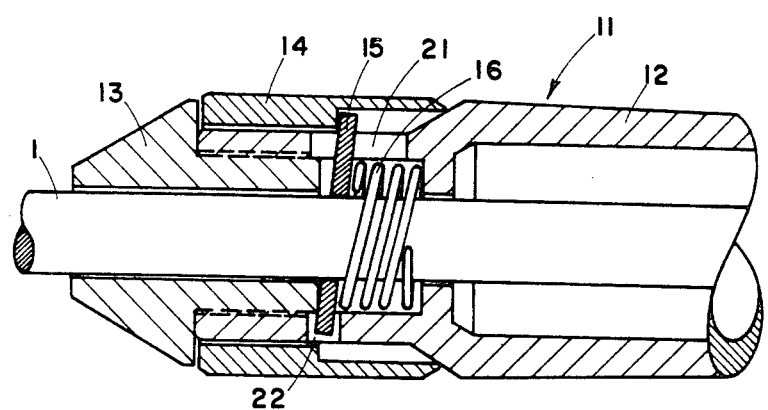
FIG. 3 is a detailed section of part of FIG. 2 with a blade-holder in a locked position.
Figures 4, 5:
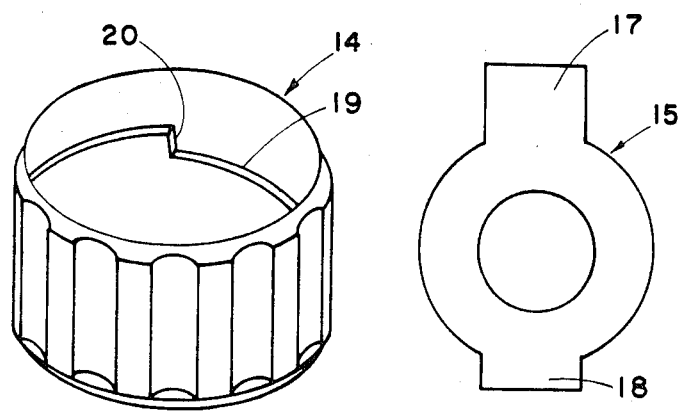
FIG. 4 is a view of the locking sleeve shown in FIGS. 2 and 3.
FIG. 5 is a top view of the locking steel washer shown in FIGS. 2 and 3.

FIG. 2 shows blade-holder 1 when inserted in holding handle 11. Holding handle 11 comprises a cylindrical member 12, locking cap 13, locking sleeve 14, steel washer 15 and spring 16. Steel washer 15 is shown in more detail in FIG. 5 with its longer lug 17 and shorter lug 18. The inner diameter of washer 15 is slightly bigger than the diameter of rod 2. Locking sleeve 14 is shown in FIG. 4 with its helix 19 and helical step 20. Cylindrical member 12 has two rectangular apertures 21 and 22, one opposite the other. These apertures allow the steel washer 15 to be inserted in the handle so that it can be perpendicular to the longitudinal axis of the handle as shown in FIG. 2 and can also assume a tilted position as shown in FIG. 3. When steel washer 15 assumes a position perpendicular to the longitudinal axis of the handle, blade-holder 1 can slide freely in the whole assembly. When the steel washer tilts, wedge action holds the blade-holder with great force. The tilting of the steel washer is performed by locking sleeve 14 which has a helical step 20 on its inside as shown in FIG. 4. The helical step contacts the longer lug 17 of the steel washer and when locking sleeve 14 is rotated clockwise, the steel washer is forced into the tilted position, thereby gripping the blade-holder as shown in FIG. 3. Such locking mechanism allows the blade-holder to be positioned at an infinite number of positions thereby allowing the blade-holder to assume multiple working lengths. When the sleeve is rotated counter-clockwise in the opposite direction, spring 16 forces back the steel washer into its normal position as shown in FIG. 2 and the blade-holder can be released.

FIG. 5 shows steel washer 15 with its round hole adapted to hold the round rod of the blade-holder. In other embodiments of the invention where the rod is of a polygonal shape such as hexagonal, the inner hole of the steel washer can also assume a polygonal shape.

I claim:

1. A blade-holder for a deburring tool capable of being inserted into a handle from either end of the blade-holder, said blade-holder comprising a rod, two longitudinal bores one at each end of said rod and releasable locking means situated in the regions of said longitudinal bores adapted for rotably holding different deburring blades, said blade-holder adapted to be inserted and fixed into a handle from either side of said blade-holder at any desired position along the rod.

* * * * *